US011938377B2

(12) United States Patent
Taras et al.

(10) Patent No.: US 11,938,377 B2
(45) Date of Patent: Mar. 26, 2024

(54) PHYSICAL THERAPY APPARATUS AND METHOD OF USE

(71) Applicant: SUREFOOTED LLC, Homer Glen, IL (US)

(72) Inventors: Bradford C. Taras, Homer Glen, IL (US); Udai M. Jayakumar, Redondo Beach, CA (US)

(73) Assignee: SUREFOOTED LLC, Homer Glen, IL (US)

( * ) Notice: Subject to any disclaimer, the term of this patent is extended or adjusted under 35 U.S.C. 154(b) by 0 days.

(21) Appl. No.: 17/687,815

(22) Filed: Mar. 7, 2022

(65) Prior Publication Data

US 2022/0184457 A1 Jun. 16, 2022

Related U.S. Application Data

(63) Continuation-in-part of application No. 16/677,870, filed on Nov. 8, 2019, now Pat. No. 11,266,893,
(Continued)

(51) Int. Cl.
*A63B 24/00* (2006.01)
*A61H 3/00* (2006.01)
*A63B 22/02* (2006.01)

(52) U.S. Cl.
CPC ......... *A63B 24/0087* (2013.01); *A61H 3/008* (2013.01); *A63B 22/02* (2013.01);
(Continued)

(58) Field of Classification Search
CPC ............ A63B 24/0087; A63B 24/0062; A63B 22/0235; A63B 22/0285; A63B 22/0015;
(Continued)

(56) References Cited

U.S. PATENT DOCUMENTS 3,897,119 A 7/1975 McMurtrie
4,204,673 A * 5/1980 Speer, Sr. .......... A63B 22/0292 601/40

(Continued)

FOREIGN PATENT DOCUMENTS

CA 2942001 A1 10/2014
KR 1020100079428 A 7/2010
WO 2010136924 A1 12/2010

OTHER PUBLICATIONS

Degelau, J. et al.; "Prevention of Falls (Acute Care)"; Institute for Clinical Systems Improvement; updated Apr. 2012.

(Continued)

*Primary Examiner* — Loan B Jimenez
*Assistant Examiner* — Kathleen M Fisk
(74) *Attorney, Agent, or Firm* — Brie A. Crawford

(57) ABSTRACT

An apparatus and method for physical therapy includes a base structure, a roller table positioned on the base structure including a plurality of free motion rollers, at least one motor and/or and at least one air compressor connected to the base structure, a plurality of powered rollers or a contact plate located within the base structure being in contact with the plurality of free motion rollers, at least one pneumatic block with a pneumatic piston connected to the at least one air compressor and being configured to raise and lower the power rollers and/or the contact plate, a load cell in communication with the apparatus being configured to measure and record a patient's response to the transition of the roller table and/or the contact plate, and a programmable logic controller.

12 Claims, 14 Drawing Sheets

Related U.S. Application Data which is a continuation-in-part of application No. 15/971,409, filed on May 4, 2018, now Pat. No. 10,835,777.

(60) Provisional application No. 62/501,886, filed on May 5, 2017.

(52) U.S. Cl.
CPC ...... *A63B 24/0062* (2013.01); *A63B 2220/50* (2013.01); *A63B 2225/093* (2013.01); *A63B 2225/096* (2013.01)

(58) Field of Classification Search
CPC ...... A63B 22/0221; A63B 22/02–0292; A63B 2220/50; A63B 2220/30; A63B 2220/51; A63B 2220/52; A63B 2220/80; A63B 2220/833; A63B 2225/096; A63B 2225/09; A63B 2225/20; A63B 71/0619; A63B 71/0054; A63B 26/003; A63B 69/0064; A63B 69/0053; A63B 2022/0092; A63B 2022/0094; A63B 2071/0675; A63B 2209/00; A61H 3/008; A61H 2201/163; A61H 2201/1652
See application file for complete search history.

(56) References Cited

U.S. PATENT DOCUMENTS 4,301,914 A 11/1981 Krammer
4,342,452 A * 8/1982 Summa ............ A63B 21/00069 482/54
4,858,599 A * 8/1989 Halpern ................. A61H 1/005 601/100
5,018,722 A * 5/1991 Whitmore .............. B65G 15/32 482/54
5,209,240 A 5/1993 Jain et al.
5,337,757 A 8/1994 Jain et al.
5,487,444 A 1/1996 Dennington
5,527,241 A * 6/1996 Peng ...................... A61H 7/001 482/54
5,562,572 A * 10/1996 Carmein ................ A63B 22/02 198/779
5,569,129 A 10/1996 Seif-Naraghi et al.
5,667,461 A * 9/1997 Hall ................... A63B 69/0064 482/54
6,063,046 A 5/2000 Allum
6,152,854 A 11/2000 Carmein
6,302,828 B1 10/2001 Martin et al.
6,436,009 B1 8/2002 Marucci
7,341,025 B1 3/2008 Streeter et al.
7,717,830 B1 * 5/2010 Charniga ............... A63B 22/02 482/54
7,806,807 B2 10/2010 Genua
7,980,856 B2 * 7/2011 Grabiner ................ A63B 24/00 434/258
8,968,161 B2 3/2015 Shapiro et al.
9,616,278 B2 4/2017 Olson
10,058,730 B2 * 8/2018 Athey ................ A63B 22/0228
2003/0153438 A1 * 8/2003 Gordon .............. A63B 69/0064 482/92
2004/0009845 A1 1/2004 Johnson
2004/0116839 A1 6/2004 Sarkodie-Gyan
2004/0214693 A1 10/2004 Piaget et al.
2005/0209061 A1 9/2005 Crawford et al.
2006/0052728 A1 * 3/2006 Kerrigan .......... A63B 21/00181 600/595
2006/0211957 A1 9/2006 Beny et al.
2006/0247104 A1 * 11/2006 Grabiner ............ A63B 22/0235 482/54
2007/0043309 A1 * 2/2007 Luetke-Wenning ... A61H 1/005 601/87
2007/0072743 A1 * 3/2007 Severino ............ A63B 22/0242 482/54
2009/0305853 A1 12/2009 Jordan
2010/0000345 A1 * 1/2010 Udono ................. B25J 19/0095 73/865.9
2010/0049105 A1 2/2010 Joannou
2010/0268129 A1 10/2010 Park
2011/0082012 A1 * 4/2011 Charniga, Jr. ......... A63B 22/02 482/54
2011/0312473 A1 12/2011 Chu et al.
2012/0071300 A1 3/2012 Shapiro et al.
2012/0108392 A1 5/2012 Chu et al.
2013/0197407 A1 8/2013 Flythe, Jr.
2014/0058299 A1 * 2/2014 Sankai ................... A61H 3/008 601/35
2014/0206503 A1 7/2014 Stockmaster et al.
2014/0336009 A1 11/2014 Piaget et al.
2016/0158622 A1 * 6/2016 Yamazaki .......... A63B 24/0087 482/7
2016/0175643 A1 6/2016 Kueker et al.
2016/0228746 A1 * 8/2016 Jayakumar ............. G16H 40/63
2017/0312582 A1 11/2017 Root, Jr.
2019/0030399 A1 * 1/2019 D'Alesio ........... A63B 21/4034
2019/0105531 A1 4/2019 Wu

OTHER PUBLICATIONS

Luukinen, H., et al.; "Predictors for recurrent falls among the homedwelling elderly"; Scandinavian Journal of Primary Health Care, 13:4, pp. 294-299, 1995.
Oliver, D., et al.; "Risk factors and risk assessment tools for falls in hospital in-patients: a systemic review"; Age and Ageing, vol. 33, No. 2, pp. 122-130, 2004.
Pai, Y., et al.; "Perturbation Training Can Reduce Community-Dwelling Older Adults' Annual Fall Risk: A Randomized Controlled Trial"; J Gerontol A Biol Sci Med Sci, vol. 69(12), pp. 1586-1594, Dec. 2014.
Salkeld, G., et al.; "Quality of life related to fear of falling and hip fracture in older women: a time trade off study"; BMJ, vol. 320, pp. 341-345, 2000.
Shumway-Cook, A., et al.; "Falls in the Medicare Population: Incidence, Associated Factors, and Impact on Health Care"; Physical Therapy, vol. 89, No. 4, pp. 324-332, 2009.
Wong, C.A., et al.; "The Cost of Serious Fall-Related Injuries at Three Midwestern Hospitals"; The Joint Commission Journal on Quality and Patient Safely, vol. 37, No. 2, pp. 81-87, 2011.
Yang, F., et al.; "Generalization of Treadmill-Slip Training to Prevent a Fall Following a Sudden (Novel) Slip in Over-Ground Walking"; J Biomech. Vol. 46(1), pp. 63-69, 2013.
PCT International Search Report; International Searching Authority; dated Aug. 31, 2017, pp. 1-6, for International Application No. PCT/US2016/019458.
PCT International Written Opinion; International Searching Authority; dated Aug. 31, 2017, pp. 1-9, for International Application No. PCT/US2016/019458.
Yang, Feng, et al.; "Reduced intensity in gait-slip training can still improve stability"; Journal of Biomechanics, Apr. 2014, vol. 47, pp. 2330-2338.
Yang, Feng, et al.; "Correction of the inertial effect resulting from a plate moving under low-friction conditions"; Journal of Biomechanics, 2007, vol. 40, pp. 2723-2730.
Zhang, M, Mar. 27, 2013, CN-102989120-A (Drawing and Abstract).
Shang, Y, 10-31-2012-CN-202506048-U(Drawings and Abstract).

* cited by examiner

PHYSICAL THERAPY APPARATUS AND METHOD OF USE

CROSS REFERENCE TO RELATED APPLICATIONS

This application claims priority to and is a continuation-in-part of the previously filed U.S. Utility patent application Ser. No. 16/677,870, titled PHYSICAL THERAPY APPARATUS AND METHOD OF USE, with an application filing date of Nov. 8, 2019 in the United States Patent and Trademark Office, by the same inventive entity. application Ser. No. 16/677,870 claims priority to and is a continuation-in-part of the previously filed U.S. Utility patent application Ser. No. 15/971,409, titled PHYSICAL THERAPY APPARATUS AND METHOD OF USE, with an application filing date of May 4, 2018, in the United States Patent and Trademark Office, by the same inventive entity. Utility patent application Ser. No. 15/971,409 was a non-provisional of U.S. Provisional Patent Application No. 62/501,886, titled PHYSICAL THERAPY EQUIPMENT FOR PREVENTING FALL INJURY BY SIMULATING UNPOWERED FALLS, with an application filing date of May 5, 2017, in the United States Patent and Trademark Office by the same inventive entity. The entire contents of patent application Ser. Nos. 16/677,870, 15/971,409, and 62/501,886 are incorporated herein by reference to provide continuity of disclosure.

BACKGROUND

Anyone can fall on a slippery surface. The elderly are at particularly increased risk of falls with increasing age, as demonstrated by staggering fall statistics that rise significantly with each decade of life above age sixty. This is a result of a natural slowing of reflexes as well as deconditioning and debility.

Falls are the leading cause of death by injuries among those aged 65 and over. Each year, more than 700,000 people suffer injuries from falls that result in hospitalizations. As people age, they are increasingly susceptible to falls as a consequence of diminished strength and delayed reaction time.

Falls among the elderly commonly lead to a loss of independence, particularly with activities of daily living (ADLs), reducing an individual's sense of dignity. Unfortunately, falls are the top reason individuals get admitted to nursing homes. The aging baby boomer population will further increase the demand for new technologies that keep them from falling and allow them to maintain an active lifestyle.

It has been shown that falls among the elderly have been reduced after a short training session on a device that simulates trips and slips. Such a device has the potential to vastly improve the unacceptably high morbidity and mortality from fall injuries, and also improve quality of life for patients while reducing the overall cost of healthcare. Thus, a need exists for such a training apparatus that is both practical to use in a clinical setting, and effective in simulating slips and trips in a controlled and safe environment. With strength training and reflex training, users should achieve a reduced likelihood of falling for a long period of time after each training session.

Currently, products available to reduce fall risk in the market address single modes of cause, are often large, or are not effective in significantly reducing the public's fall risk. Existing therapies commonly create forced perturbations utilizing motorized movements of treadmill belts and traditional training methods, such as walking on foam mats, that are only helpful in improving strength and proprioception but have negligible impact on developing reflexes. It is more impactful to simulate a natural slip or trip so that a person's neuromuscular system learns the reflexes needed to activate the appropriate muscles rapidly to anticipate and counter a loss of balance after a loss in traction, thus preventing a fall.

Accordingly, there is a need for a physical therapy apparatus that is practical to use in a clinical setting, and also effective in simulating natural slips and trips in a controlled and safe environment.

SUMMARY

An apparatus for physical therapy is disclosed. In a first embodiment, the apparatus includes a base structure, a roller table positioned on the base structure, the roller table including an outer frame and a plurality of free motion rollers positioned within the outer frame, at least one motor connected to the base structure, a plurality of powered rollers located within the base structure and connected to the at least one motor, the plurality of powered rollers being positioned beneath the plurality of free motion rollers, a lifting mechanism located within the base structure and connected to the at least one motor, the lifting mechanism being configured to raise and lower the roller table to transition the apparatus between a first position and a second position, a load cell in communication with the apparatus, the load cell being configured to sense and record a patient's response to the transition of the roller table from the first position to the second position, and a programmable logic controller (PLC) in communication with the at least one motor and the load cell, the PLC being configured to control the transition of the apparatus between the first position and the second position.

In a first embodiment, the apparatus also has the plurality of free motion rollers that are aligned in two parallel columns along a single plane.

In a first embodiment, the apparatus may include first and second motors, the first motor configured to provide power to the powered rollers and the second motor configured to provide power to the lifting mechanism.

In a first embodiment, the lifting mechanism preferably includes four cams located within the base structure, wherein two first cams are positioned near an interior first side of the base structure and two second cams are positioned near an interior second side of the base structure, a vertical beam secured to each cam, and a first axle connecting the two first cams together and a second axle connecting the two second cams together, wherein one of the cams is secured to and powered by the at least one motor.

In a first embodiment, the axles are positioned off center within the outer circumference of each of the cams, thereby creating a smaller radius and a larger radius.

In a first embodiment, in the first position, the cams are positioned with the smaller radius being closer to the roller table and in line with the vertical beams, and in the second position, the cams are positioned with the larger radius being closer to the roller table and in line with the vertical beams.

In a first embodiment, the PLC may have an automated mode and a manual mode.

In a first embodiment, a method for using a physical therapy apparatus is disclosed. The method includes providing an apparatus including a base structure having a roller table positioned thereon, the roller table including an outer frame and a plurality of free motion rollers positioned within the outer frame, at least one motor connected to the base structure, a plurality of powered rollers located within the base structure and connected to the at least one motor, the plurality of powered rollers being positioned beneath the plurality of free motion rollers, and a lifting mechanism located within the base structure and connected to the at least one motor. The method further includes operating the apparatus in a first mode wherein a patient walks on the roller table in a first position in which the plurality of free motion rollers are in contact with the plurality of powered rollers, operating the apparatus in a second mode in which the lifting mechanism raises the roller table to a second position so that the plurality of free motion rollers are not in contact with the plurality of powered rollers, and sensing and recording a patient's response to the second mode via a load cell.

In a first embodiment, the method further includes operating the apparatus in a third mode, in which the at least one motor provides a burst of increased acceleration, causing an increase of the speed of the roller table.

In a first embodiment, the method preferably includes sensing and recording a patient's response to the third mode via the load cell.

The method of the first embodiment preferably includes sending the recorded response to a programmable logic controller.

In a first embodiment, the lifting mechanism raises the roller table by rotating the cams to a position in which the larger radius is closer to the roller table and in line with the vertical beams.

In a second embodiment, an apparatus for physical therapy is disclosed. The apparatus includes a base structure, a roller table positioned on the base structure, the roller table including an outer frame and a plurality of free motion rollers positioned within the outer frame, at least one motor and at least one air compressor connected to the base structure, a plurality of powered rollers located within the base structure and connected to the at least one motor, the plurality of powered rollers being positioned beneath the plurality of free motion rollers, at least one pneumatic block containing at least one pneumatic piston being connected to the at least one air compressor and configured to raise and lower the roller table to transition the apparatus between a first position and a second position, a load cell in communication with the apparatus, the load cell being configured to sense and record a patient's response to the transition of the roller table from the first position to the second position, and a programmable logic controller (PLC) in communication with the at least one motor and the load cell, the PLC being configured to control the transition of the apparatus between the first position and the second position.

In a second embodiment, the apparatus also has the plurality of free motion rollers that are aligned in two parallel columns along a single plane.

In a second embodiment, the apparatus preferably has a support structure secured to a ceiling, wherein the load cell is secured to the support structure.

In a second embodiment, the apparatus preferably has a safety cord secured to the load cell, wherein the safety cord is configured to attach to a belt or harness on a patient.

In a second embodiment, the PLC may have an automated mode and a manual mode.

In a second embodiment, at least one pneumatic piston and at least two springs support the powered rollers against the free motion rollers.

In a second embodiment, a method for using a physical therapy apparatus is disclosed. The method includes providing an apparatus including a base structure having a roller table positioned thereon, the roller table including an outer frame and a plurality of free motion rollers positioned within the outer frame, at least one motor and at least one air compressor connected to the base structure, a plurality of powered rollers located within the base structure and connected to the at least one motor and at least one pneumatic piston connected to the at least one air compressor, the plurality of powered rollers being positioned beneath the plurality of free motion rollers, and at least one pneumatic block containing the at least one pneumatic piston located within the base structure and connected to the at least one air compressor. The method further includes operating the apparatus in a first mode wherein a patient walks on the roller table in a first position in which the plurality of free motion rollers are in contact with the plurality of powered rollers, operating the apparatus in a second mode in which the at least one pneumatic piston lowers the plurality of powered rollers to a second position so that the plurality of free motion rollers are not in contact with the plurality of powered rollers, and sensing and recording a patient's response to the second mode via a load cell.

In a second embodiment, the method further includes operating the apparatus in a third mode, in which the at least one motor provides a burst of increased acceleration, causing an increase of the speed of the roller table.

In a second embodiment, the method preferably includes sensing and recording a patient's response to the third mode via the load cell.

The method of the second embodiment preferably includes sending the recorded response to a programmable logic controller.

In a third embodiment, an apparatus for physical therapy is disclosed. The apparatus includes a base structure, a roller table positioned on the base structure, the roller table including an outer frame and a plurality of free motion rollers positioned within the outer frame, at least one air compressor connected to the base structure, a contact plate located within the base structure and connected to the at least one air compressor, the contact plate being positioned beneath the plurality of free motion rollers, at least one pneumatic block containing at least one pneumatic piston being connected to the at least one air compressor and configured to raise and lower the contact plate to transition the apparatus between a first position and a second position, a load cell in communication with the apparatus, the load cell being configured to sense and record a patient's response to the transition of the contact plate from the first position to the second position, and a preferably a programmable logic controller (PLC) in communication with the load cell, the PLC being configured to control the transition of the apparatus between the first position and the second position.

In a third embodiment, the apparatus also has the plurality of free motion rollers that are aligned in two parallel columns along a single plane.

In a third embodiment, the apparatus preferably has a support structure secured to a ceiling, wherein the load cell is secured to the support structure.

In a third embodiment, the apparatus preferably has a safety cord secured to the load cell, wherein the safety cord is configured to attach to a belt or harness on a patient.

In a third embodiment, the PLC may have an automated mode and a manual mode.

In a third embodiment, a method for using a physical therapy apparatus is disclosed. The method includes providing an apparatus including a base structure having a roller table positioned thereon, the roller table including an outer frame and a plurality of free motion rollers positioned within the outer frame, at least one air compressor connected to the base structure, a contact plate located within the base structure and connected to the at least one air compressor and at least one pneumatic piston connected to the at least one air compressor, the contact plate being positioned beneath the plurality of free motion rollers, and at least one pneumatic block containing the at least one pneumatic piston located within the base structure and connected to the at least one air compressor. The method further includes operating the apparatus in a first mode wherein a patient walks on the roller table in a first position in which the plurality of free motion rollers are in contact with the contact plate, operating the apparatus in a second mode in which the at least one pneumatic piston lowers the contact plate to a second position so that the plurality of free motion rollers are not in contact with the contact plate, and sensing and recording a patient's response to the second mode via a load cell.

The method of the third embodiment preferably includes sending the recorded response to a programmable logic controller.

DETAILED DESCRIPTION

Figure 1:
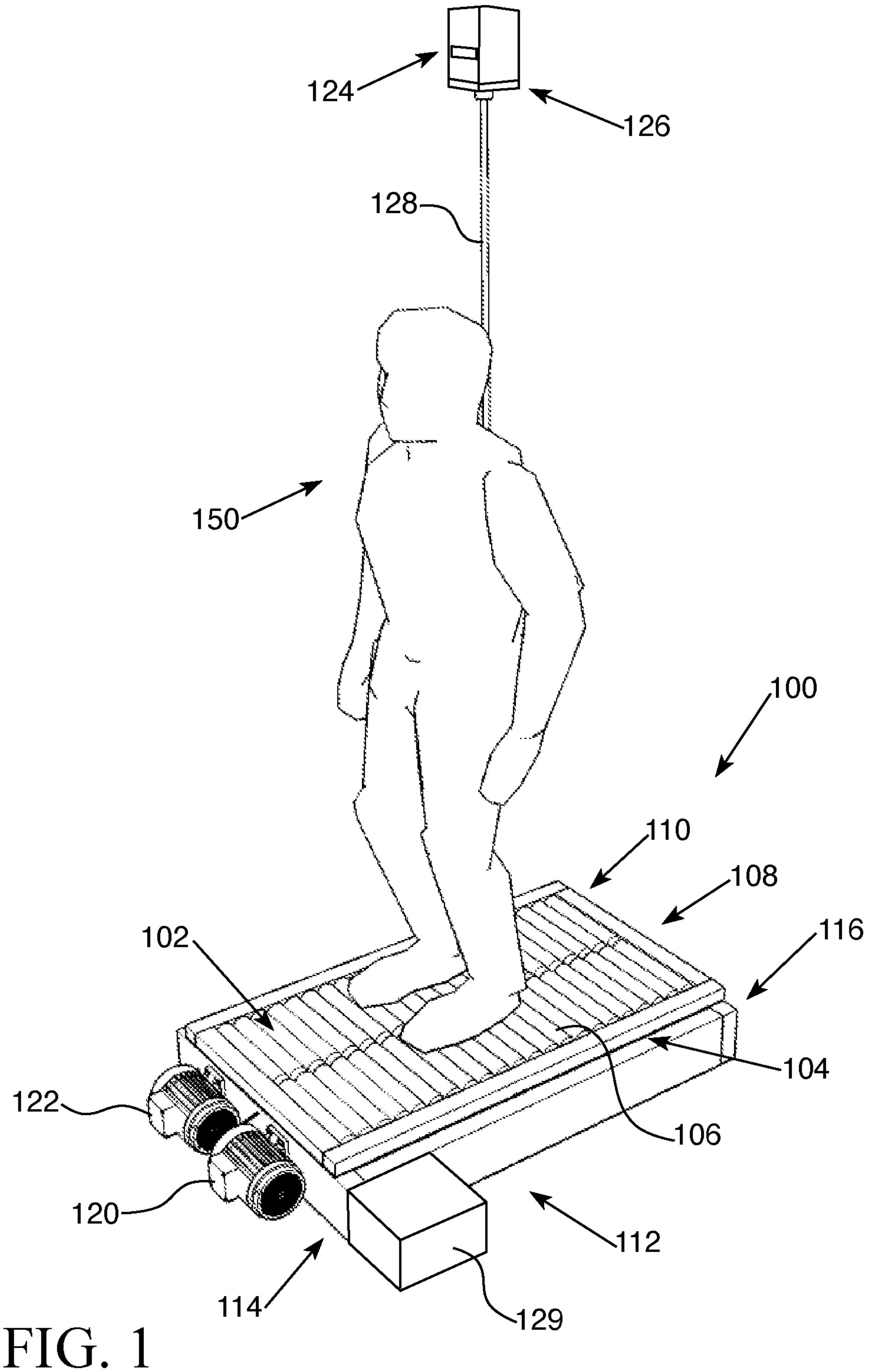
FIG. 1 shows an apparatus 100 according to a first embodiment of the disclosure.

The physical therapy apparatus of the present disclosure reduces physical harm to patients by preventing injuries from falling, while reconditioning overall mobility and reflexes. Specifically, the apparatus induces neuromuscular training through multiple simulations of powered slips and trips and natural slips and trips. A slip occurs when a patient's center of mass shifts posteriorly leading the subject to land on his/her backside. A trip is the opposite type of fall in which the patient's center of mass shifts anteriorly, thereby causing the subject to land on his/her front-side.

Patients are reconditioned with advanced reflexes which increases their stability and reduces injuries from falls. The simulations of the apparatus stimulate the monosynaptic and polysynaptic reflex circuits within the vestibular, ocular, vestibulo-ocular, cerebellar, and neuromuscular systems. Continual stimulations lead to safe recovery of the patient undergoing fall conditions.

The apparatus includes a roller table with two parallel columns of freely moving rollers positioned above a base having powered rollers. In one embodiment, the roller table rests on a lifting mechanism that can raise the roller table causing the freely moving rollers to disengage with the powered rollers, which allows the free motion rollers to transition from a powered treadmill to a highly slippery surface. The apparatus may be in communication with a load cell for monitoring patient falls, speed and other parameters, instrumentation to adapt equipment setting based on patient responses and a central programmable logic controller (PLC) mounted to the base structure to control the equipment operations, an Ethernet switch to communicate patient output with a data processing system and a central data processing system to suggest patient treatments and track patient progress.

In the first and second embodiments of this invention, the apparatus is designed for patients to be used in a first mode, by walking on the roller table continuously in one direction like a treadmill. In a second mode, the apparatus simulates slippery conditions by disengaging the powered rollers from the free motion rollers on the roller table, thereby reducing positive drive and allowing the individual rollers of the roller table to move freely, which results in patients having to manage highly slippery conditions, while supported from above by an external safety system. In a third mode, the roller table operates like a treadmill and the rollers are accelerated in a quick burst to cause the patient's feet to move from underneath their center of gravity and cause a forced fall.

Now adding FIG. 1, FIG. 2, FIG. 3, FIG. 4, and FIG. 5 to the consideration, a first embodiment of the apparatus 100 includes a roller table 102 upon which a patient 150 may stand and walk. The roller table 102 includes an outer frame 104 which supports a plurality of free motion rollers 106 in parallel. Each roller is positioned to an adjacent roller with little space in between, such as less than 1/16 inch, for example, to prevent any pinch points, and to provide the maximum amount of rollers 106 to support the patient, and also to enable the roller table 102 to feel more like a flat walking surface. There are two columns 108, 110 of rollers 106 positioned adjacent to each other within the outer frame 104. The two columns of rollers 108, 110 are separated to allow independent rotation and free biaxial motion for each of the patient's feet. The free motion rollers 106 are preferably constructed of elastic and high friction material.

Figure 2:
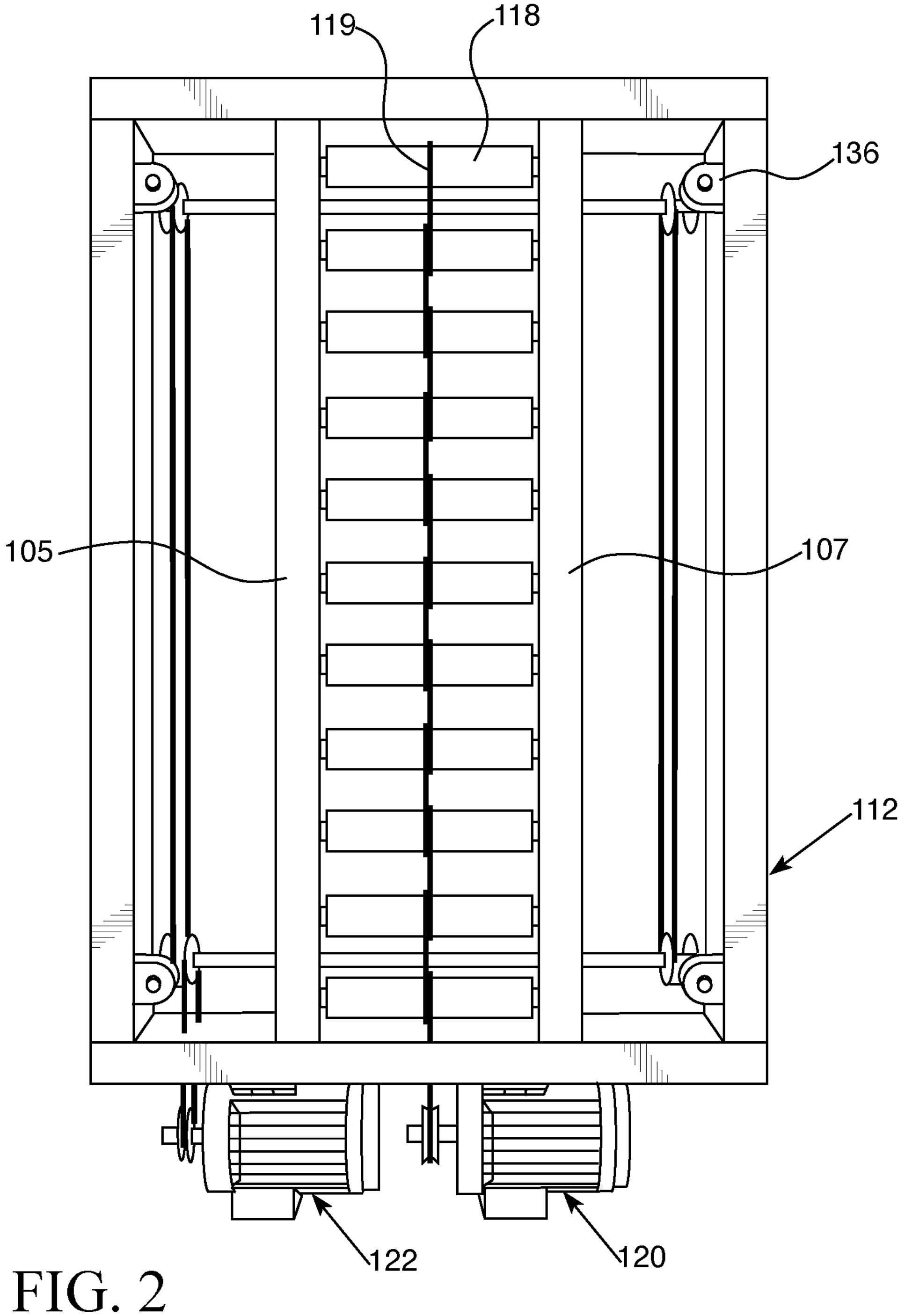
FIG. 2 shows a bottom view of the apparatus 100 shown in FIG. 1.
Figure 3:
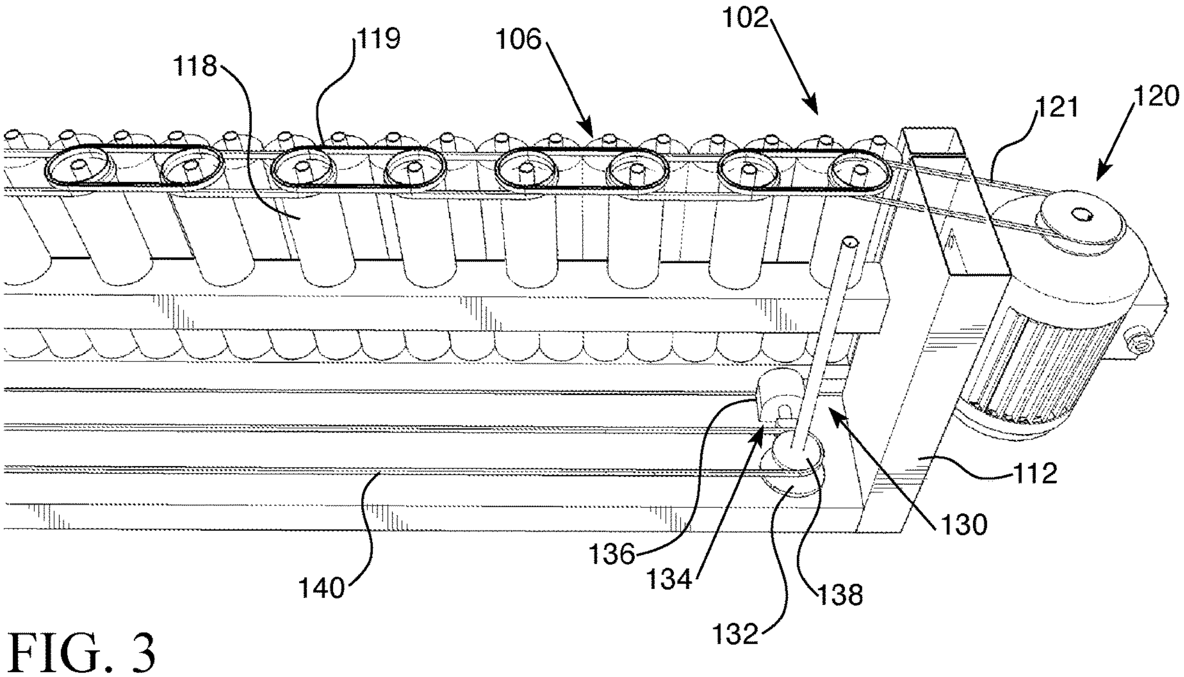
FIG. 3 shows a bottom perspective view of one half of the apparatus 100 shown in FIG. 1.
Figure 4:
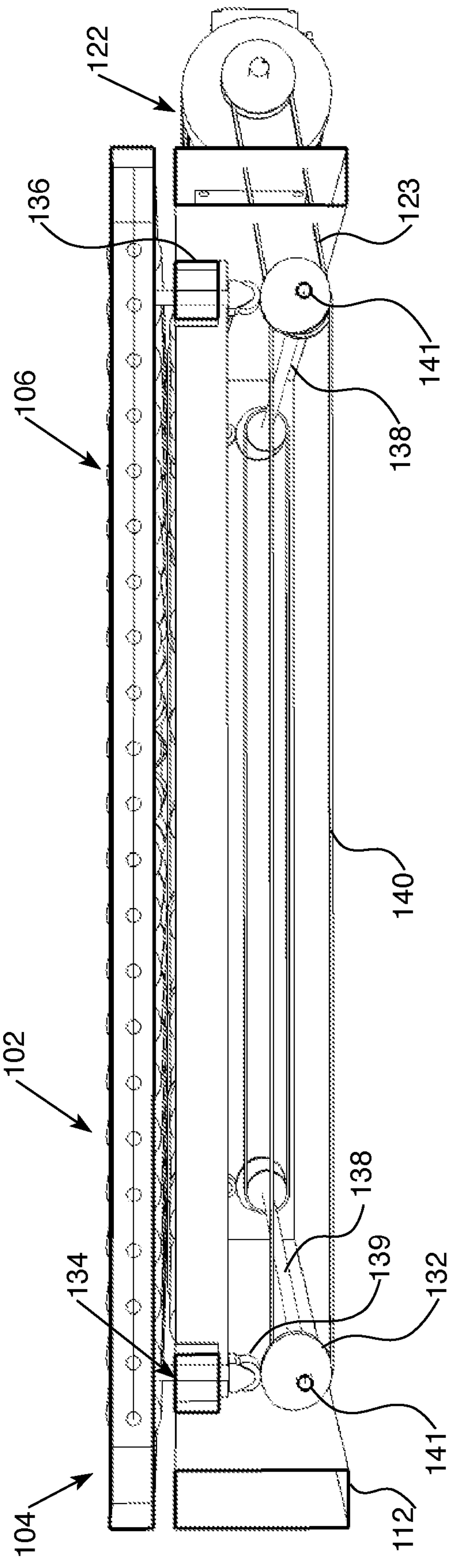
FIG. 4 shows a side cross-sectional view of the apparatus 100 shown in FIG. 1.

The roller table 102 is situated atop a base structure 112. The base structure 112 includes a first end 114 and a second end 116. The base structure 112 houses a plurality of powered rollers 118 and a lifting mechanism 130, which are shown in FIGS. 2-4 and described in more detail below. As shown in FIG. 2, two internal members 105, 107 are positioned within the base structure 112 extending from the first end 114 to the second end 116. The powered rollers 118 are positioned between the internal members 105, 107.

The first end 114 of the base structure includes first and second electrical motors 120, 122. The first motor 120 provides power to the powered rollers 118. The second motor 122 provides power to the lifting mechanism 130. It is optional to use only one motor to power both the powered rollers 118 and the lifting mechanism 130.

The apparatus 100 is in communication with a support structure 124 mounted to a ceiling of a physical therapy space. A load cell 126 is located within or secured to the support structure 124, and a safety cord 128 is connected to the load cell 126. The safety cord 128 attaches to a safety harness or belt (not shown) worn by the patient 150. The load cell 126 senses and records the patient response to the equipment's stimuli, like changes in slope and speed of mode. The load cell 126 is used to measure the amount of weight the patient relies on the safety structure (124, 128, and the harness) during a fall. If no load is applied to the load cell 126, then no fall occurred. If the load cell 126 measures less than half the weight of the patient, then the patient became off balance. If more than half the weight of the patient is measured by the load cell 126, then the event is recorded as a fall. The fall event information is recorded and can be utilized by a PLC (described below) to modify the number, type, or frequency of fall simulations. The load cell 126 may be located within the safety harness or belt rather than in the support structure 124.

The apparatus 100 also includes a programmable logic controller (PLC) 129. The PLC 129 is connected to the base structure 112 and is in communication with the first motor 120. Alternatively, the PLC 129 may be located in a panel mounted to the base structure 112. It should be understood that the PLC 129 may be secured to any part of the base structure 112. The PLC 129 controls the switching of the apparatus between the first mode, the second mode, and the third mode, as described in more detail below. The PLC 129 controls the actuations and the transitions between the first, second, and third modes by using an algorithm that incorporates fall data recorded from the load cell 126.

The PLC 129 preferably has both a manually operated mode and an automated mode. A human machine interface (HMI) is needed to operate either mode and is linked to the PLC 129. The automated mode responds to patient stimuli gathered through the load cell 126 and/or additional instrumentation. As the patient improves and responds positively to the slip and trip inducing stimuli, then the automated mode may increase the speed or frequency of slip and trip powered fall simulations.

The PLC 129 also compiles rotational data from a motor encoder (not shown) with timer input to calculate the velocity of the patient, and records the downward force a patient places upon the safety harness during slip and trip events using the load cell 126.

Referring now to FIG. 3, a bottom view of the interior of a portion of the base structure 112 is shown. The plurality of powered rollers 118 are positioned in parallel, and set to rest underneath and in between two free motion rollers 106. One of the powered rollers 118 is in contact with four (4) free motion rollers 106, two parallel sets of adjacent free motion rollers, and so there are less powered rollers 118 than free motion rollers 106 present on the apparatus 100. Although the outer frame 104 of the roller table 102 is the same length as the base 112, the outer frame 104 and the base 112 do not contact each other, because that would prevent the surfaces of the free motion rollers 106 from engaging with the surfaces of the powered rollers 118.

The first motor 120 provides power to the powered rollers 118, and is connected to the closest powered roller 118 through a chain or belt 121. Two powered rollers 118 are connected to one another via roller belts 119. The roller belts 119 rest in the gap that separates the two adjacent columns 108, 110 of free motion rollers 106 from FIG. 1. The surface of the powered rollers 118 and the free motion rollers 106 may be slightly elastic and of high friction to assist the transfer of motion between the two while in treadmill mode.

Referring again to FIG. 3, the lifting mechanism 130 is shown. The lifting mechanism 130 includes a plurality of elements positioned in each of the four interior corners of the base structure 112. The lifting mechanism 130 may include four cams 132 that rotate and change the height of four vertical beams 134. The vertical beams 134 are secured in position at four blocks 136, which are mounted to the inside wall of the base structure 112. Motion of the cams 132 is aligned by locking the two front cams together and the two back cams together with axles 138. Motion between the axles 138 is transferred using a chain 140 and sprockets 141 mounted to the end of the axles 138.

Figure 5:
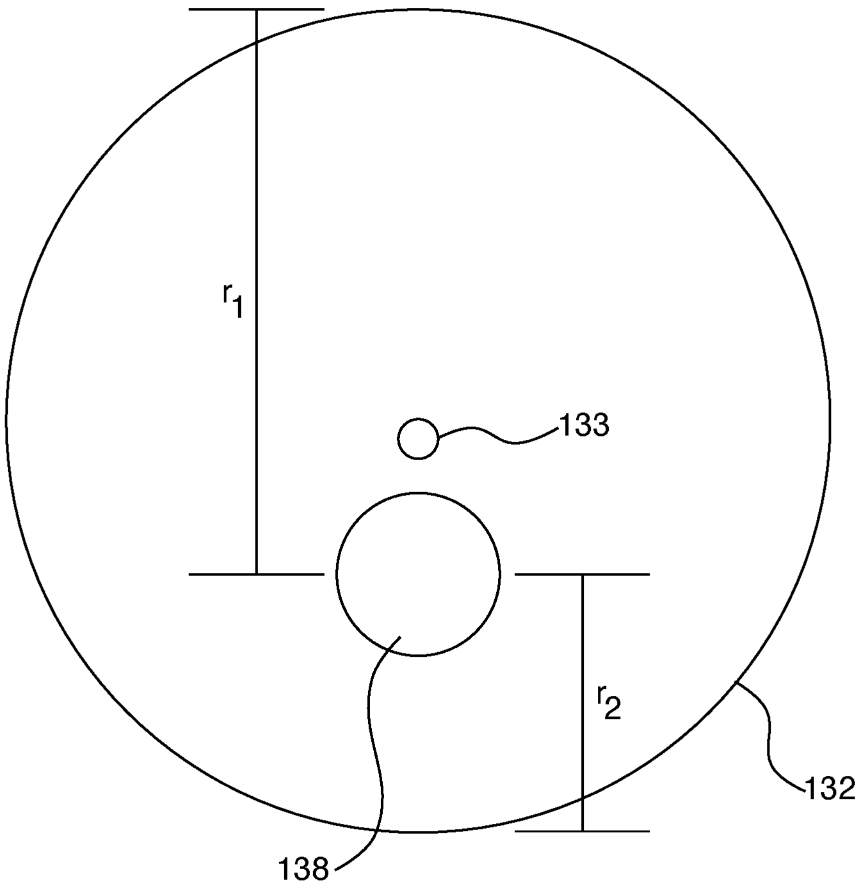
FIG. 5 shows a side view of a portion of the apparatus 100 shown in FIG. 1.

FIG. 4 shows the apparatus 100 in a second position in which the lifting mechanism 130 has been actuated. As mentioned above, the second electrical motor 122 is used to power the lifting mechanism 130. The second motor 122 is connected to one of the axles 138 of the lifting mechanism 130 by a chain or belt 123. The axles 138 are positioned off center 133 within the outer circumference of the cams 132, as shown in FIG. 5. Thus, in one configuration, when the cams 132 are rotated to a point where the larger radius $r_1$ is positioned closer to the roller table 102 and in line with the vertical beams 134, the vertical beams 134 are raised or lifted upwardly toward the roller table 102, which in turn lifts the roller table 102 upwardly and away from the base 112, thereby disengaging contact between the powered rollers 118 and the free motion rollers 106. In a second configuration, where the smaller radius $r_2$ is positioned closer to the roller table 102 and in line with the vertical beams 134, the vertical beams 134 are lowered back down to their initial position, which in turn lowers the roller table down and toward the base 112, thereby returning the roller table 102 to its original position so that the free motion rollers 106 engage the powered rollers 118.

Wheels 139 may be mounted at the end of the vertical beams 134 between the vertical beams 134 and the cams 132 to help reduce friction and wear on the cams 132. The wheels 139 may be mounted onto the vertical beam 134 by a bolt or any other suitable fastener. Any non-rotational motion of the wheels 139 and the vertical beams 134 is prevented because the beams 134 are locked in a horizontal position by the location blocks 136 mounted to the base structure 112. It should be understood that any friction-reducing mechanism may be used instead of the wheels 139.

In operation, the apparatus 100 may operate in a first mode, which may be a walking or treadmill mode, a second mode, which may be a slip mode, and a third mode, which may be a trip mode. Initially, the apparatus 100 is in a starting position or stationary mode in which the roller table 102 is in a first position, where the free motion rollers 106 contact the powered rollers 118. The cams 132 are positioned with the smaller radius $r_2$ positioned closer to the roller table 102 and in line with the vertical beams 134. Depending upon whether the apparatus is being operated in an automatic or manual mode, either the PLC 129 or an operator triggers a signal to start the apparatus 100 in a first, or treadmill mode.

During the first mode, the speed of the first and second motors 120, 122 may be controlled and monitored by the PLC 129. The first motor 120 rotates, causing the chain or belt 121 to rotate the powered rollers 118. The rotational motion of the powered rollers 118 transfers to the free motion rollers 106, causing them to rotate as well. The patient 150 walks on the roller table 102 and remains at a constant position/height relative to the ground. The PLC 129 controls the lifting mechanism 130 to transition the apparatus 100 from treadmill mode to the second or slippery mode. In the second, slippery mode, the second motor 122 rotates, causing the axles 138 and the cams 132 of the lifting mechanism 130 to rotate. It is optional for the second motor 122 to rotate a predetermined number of times. After the predetermined number of rotations, the rotation stops when the cams 132 are positioned with the larger radius $r_1$ positioned closer to the roller table 102. Thus, the vertical beams 134 are lifted and therefore the roller table 102 is lifted about ¼ inch vertically to disengage the free motion rollers 106 from the powered rollers 118. Thus, the individual powered rollers 118 can move freely. When in slippery mode, every roller, including free motion rollers 106 and powered rollers 118, is free to move at extremely low friction. The patient is therefore only lifted slightly and should barely notice a change. The patient continues walking, but the surface is very slippery. The patient will therefore likely lose balance and fall. The load cell 126 senses the fall and records the fall signal, which is sent to either the PLC 129 (in automated mode) or logged by an operator (in manual mode). The apparatus 100 is then set back to the starting position or stationary mode. The roller table 102 and lifting mechanism 130 are returned to their original positions.

In the second mode, the roller table 102 and patient 150 are lifted to ensure that during breakdowns, the roller table 102 will remain in contact with the powered rollers 118, and reduce the chance of a patient slipping on the free motion rollers 106 set in slippery mode. Also, the weight of the roller table 102 and patient 150 will generate sufficient friction between the surfaces of the free motion rollers 106 and the powered rollers 118, thereby reducing slippage between the two sets of rollers while in the first, or treadmill mode.

The apparatus 100 can also operate in a third, trip mode. During the third mode, the powered rollers 118 remain engaged with the free motion rollers 106, and the powered rollers undergo a burst of increased acceleration, which causes an unexpected increase of the speed of the roller table 102. The first motor 120 can be configured to rotate either clockwise or counter-clockwise, allowing the powered rollers to roll either backward or forward. The patient 150 continues walking, but at a much greater pace, and will therefore likely lose their balance and fall. Similarly to the second mode, the load cell 126 senses the fall and records the fall signal, which is sent to either the PLC 129 (in automated mode) or logged by an operator (in manual mode). The apparatus 100 is then set back to the starting position or stationary mode. The roller table 102 and lifting mechanism 130 are returned to their original positions.

When in the first and third modes (treadmill and trip mode), all rollers (both free motion and powered) move in unison. The patient uses the apparatus 100 and patient data (such as, but not limited to, falls and imbalance events compared to simulation settings) gathered over time and is saved short term to a data logger connected to the PLC 129 which is connected to all instrumentation. The operating algorithm on the PLC 129 uses the patient data to modify treadmill speeds, directions and the frequency of slip mode and trip mode events. At the end of a patient session, the patient data is uploaded to a network switch that patches it into a database or enterprise system, such as an Electronic Medical Record (EMR) system that stores the patient's history. The data is also sent to an enterprise program that evaluates the data from the session and sends a final report to the equipment to be received by the physical therapist or technician managing the patient. This report provides progress of the patient over a series of sessions using the equipment. The database may also provide additional input to a physical therapist recommending other procedures leading to better patient outcome.

The apparatus disclosed herein may improve the excessive cost of fall injuries on our health system, while also improving quality of life for patients.

It is optional for the apparatus to include a base that allows the roller table and wheels (or other cylinders) to move at low friction along one or two axes of travel and houses the cylinder, to simulate walking up, down, or horizontally along a hill. These changes in slope can also be used for balance training while the user is standing still. The apparatus is connected to the internet through a managed switch to provide an enterprise system with documentation of the results of the patient's therapy session.

Figure 6A:
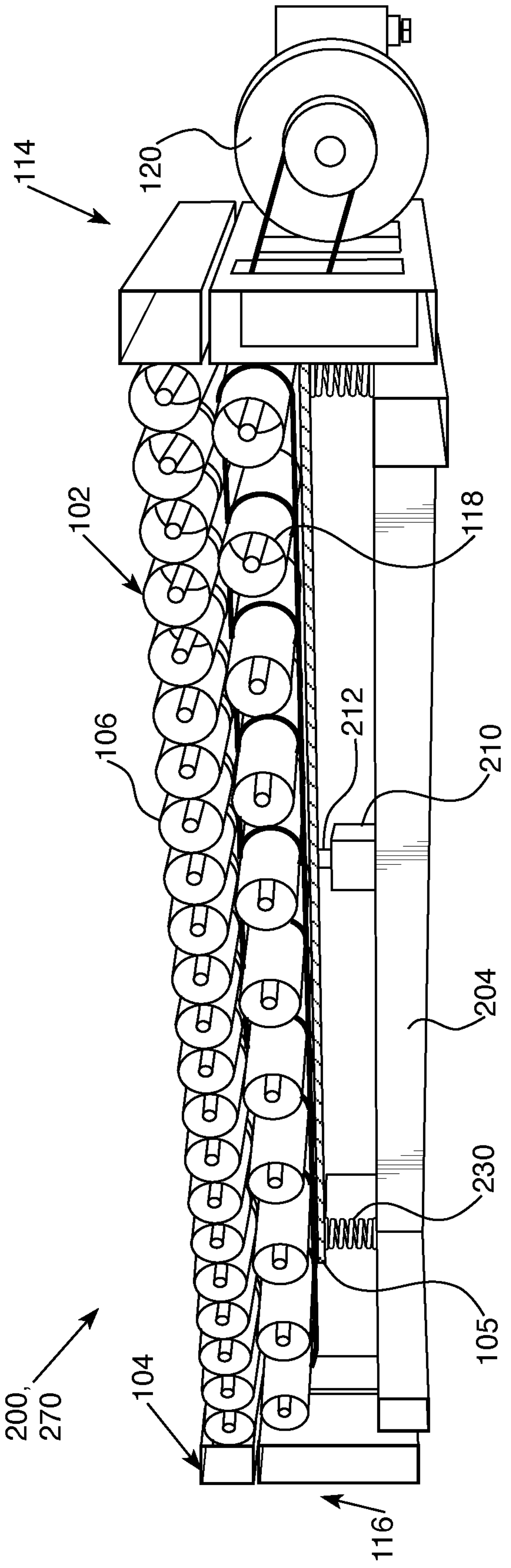
FIG. 6*a* shows a cross-sectional view of a second embodiment of the apparatus 200.
Figure 6B:
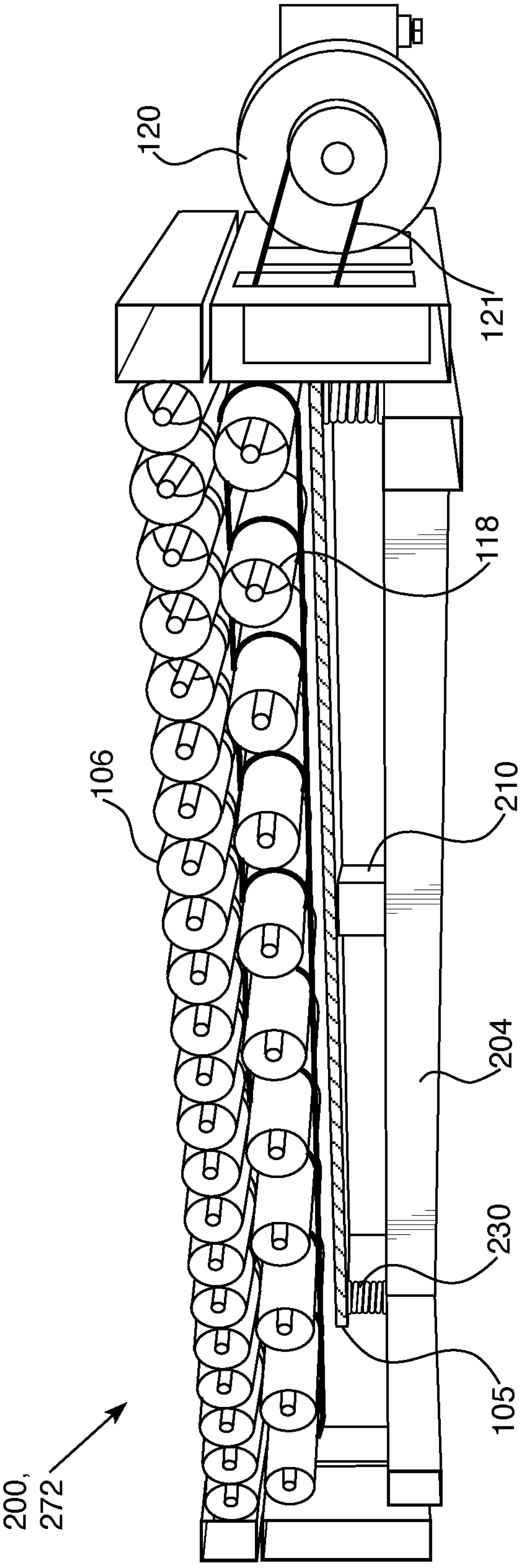
FIG. 6*b* shows a cross-sectional view of a second embodiment of the apparatus 200.
Figure 7:
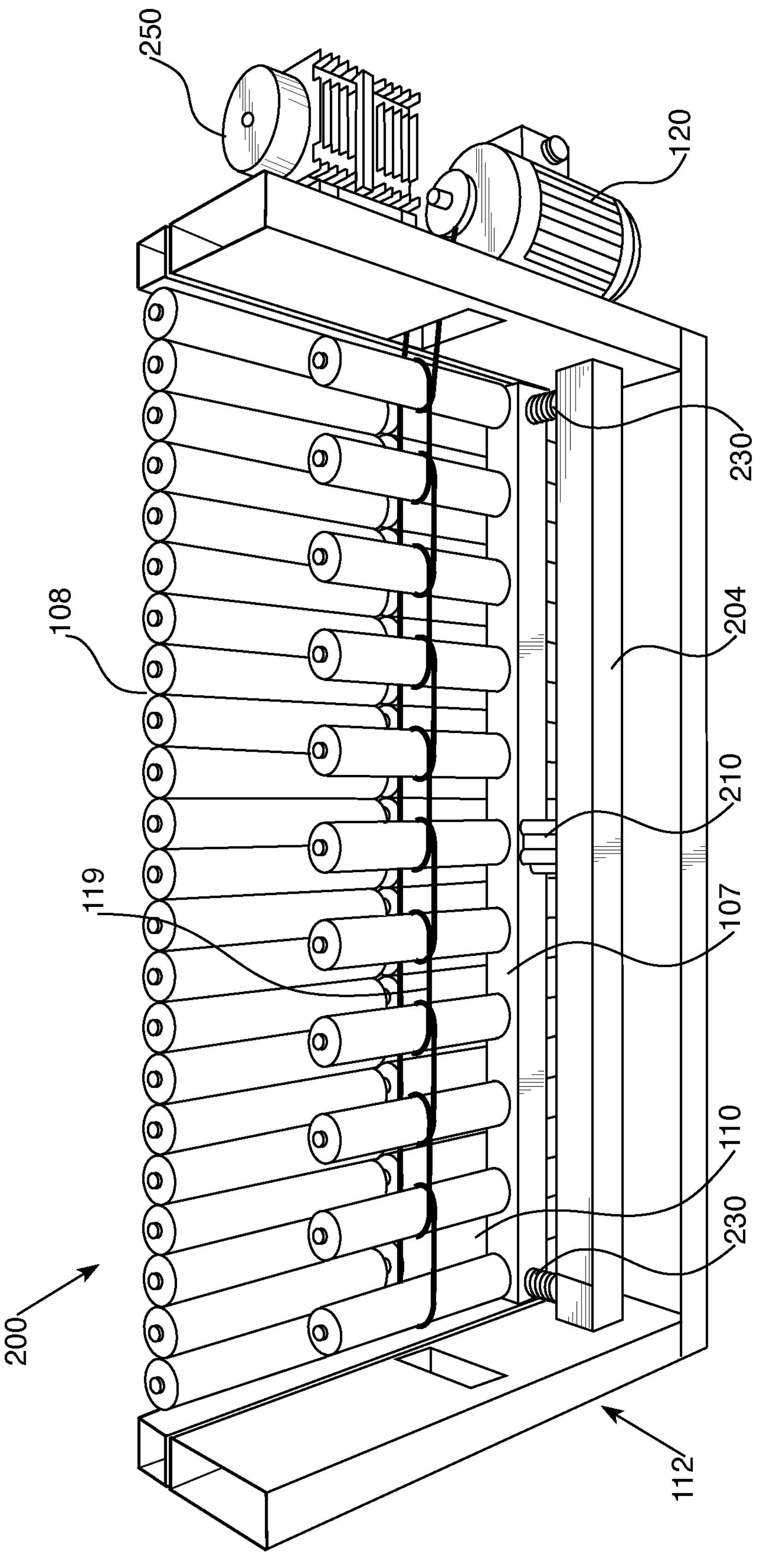
FIG. 7 shows a bottom perspective view of one half of a second embodiment of the apparatus 200.

Now adding FIG. 6*a*, FIG. 6*b*, and FIG. 7 to the consideration, a second embodiment 200 can be clearly seen.

Apparatus 200 includes a roller table 102 upon which a patient 150 may stand and walk. The roller table 102 includes an outer frame 104 which supports a plurality of free motion rollers 106 in parallel. Each roller is positioned to an adjacent roller with little space in between, such as less than 1/16 inch, for example, to prevent any pinch points, and to provide the maximum amount of rollers 106 to support the patient, and also to enable the roller table 102 to feel more like a flat walking surface. There are two columns 108, 110 of rollers 106 positioned adjacent to each other within the outer frame 104. The two columns of rollers 108, 110 are separated to allow independent rotation and free biaxial motion for each of the patient's feet. The free motion rollers 106 are preferably slightly elastic and of high friction.

The roller table 102 is situated atop a base structure 112. The base structure 112 includes a first end 114 and a second end 116. The base structure 112 houses a plurality of powered rollers 118. Two internal members 105, 107 are positioned within the base structure 112 extending from the first end 114 to the second end 116. The powered rollers 118 are positioned between the internal members 105, 107.

The first end 114 of the base structure preferably includes electrical motor 120 and air compressor 250. The first motor 120 provides power to the powered rollers 118.

The apparatus 200 is in communication with a support structure 124 mounted to a ceiling of a physical therapy space. A load cell 126 is located within or secured to the support structure 124, and a safety cord 128 is connected to the load cell 126. The safety cord 128 attaches to a safety harness or belt (not shown) worn by the patient 150. The load cell 126 senses and records the patient response to the equipment's stimuli, like changes in slope and speed of mode. The load cell 126 is used to measure the amount of weight the patient relies on the safety structure (124, 128, and the harness) during a fall. If no load is applied to the load cell 126, then no fall occurred. If the load cell 126 measures less than half the weight of the patient, then the patient became off balance. If more than half the weight of the patient is measured by the load cell 126, then the event is recorded as a fall. The fall event information is recorded and can be utilized by a PLC 129 to modify the number, type, or frequency of fall simulations. The load cell 126 may be located within the safety harness or belt rather than in the support structure 124.

The apparatus 200 also includes a PLC 129. The PLC 129 is connected to the base structure 112 and is in communication with the first motor 120. Alternatively, the PLC 129 may be located in a panel mounted to the base structure 112. It should be understood that the PLC 129 may be secured to any part of the base structure 112. The PLC 129 controls the switching of the apparatus between the first mode, the second mode, and the third mode, as described in more detail below. The PLC 129 controls the actuations and the transitions between the first, second, and third modes by using an algorithm that incorporates fall data recorded from the load cell 126.

The PLC 129 preferably has both a manually operated mode and an automated mode. A human machine interface (HMI) is needed to operate either mode and is linked to the PLC 129. The automated mode responds to patient stimuli gathered through the load cell 126 and/or additional instrumentation. As the patient improves and responds positively to the slip and trip inducing stimuli, then the automated mode may increase the speed or frequency of slip and trip powered fall simulations.

The PLC 129 also compiles rotational data from a motor encoder (not shown) with timer input to calculate the velocity of the patient, and records the downward force a patient places upon the safety harness during slip and trip events using the load cell 126.

The plurality of powered rollers 118 are positioned in parallel, and set to rest underneath and in between two free motion rollers 106. One of the powered rollers 118 is in contact with four (4) free motion rollers 106, two parallel sets of adjacent free motion rollers, and so there are less powered rollers 118 than free motion rollers 106 present on the apparatus 200. Although the outer frame 104 of the roller table 102 is the same length as the base 112, the outer frame 104 and the base 112 do not contact each other, because that would prevent the surfaces of the free motion rollers 106 from engaging with the surfaces of the powered rollers 118.

The first motor 120 provides power to the powered rollers 118, and is connected to the closest powered roller 118 through a chain or belt 121. Two powered rollers 118 are connected to one another via roller belts 119. The roller belts 119 rest in the gap that separates the two adjacent columns 108, 110 of free motion rollers 106. The surface of the powered rollers 118 and the free motion rollers 106 may be slightly elastic and of high friction to assist the transfer of motion between the two while in treadmill mode.

Base structure 112 has support members 202 and 204. The air compressor 230 is operably connected to one or more pneumatic blocks 210 which each contain a pneumatic piston 212. The one or more pneumatic blocks 210 and also one or more springs 230 are connected to support members 202 and 204. It is preferable that at least four springs 230 are present and one spring 230 is positioned in each of the four interior corners of the base structure 112. The internal members 105 and 107 rest on the one or more pneumatic pistons 212. The one or more springs 230 also contact the internal members 105 and 107 and aid in supporting the powered rollers 118.

In FIG. 6*a*, the one or more pneumatic blocks 210 are decompressed and the one or more pneumatic pistons 212 are raised from the pneumatic blocks 210. The raising of the pneumatic pistons 212 from the pneumatic blocks 210 raises or lifts upwardly the internal members 105 and 107 toward the free motion rollers 106, thereby engaging contact between the powered rollers 118 and the free motion rollers 106 to create first position 270 and this position 270 is supported by the one or more springs 230. This produces the more stable, treadmill, walking surface.

In FIG. 6*b*, to disengage the powered rollers 118 from the free motion rollers 106, air compressor 250 provides thrust to the pneumatic blocks 210 which causes the pneumatic pistons 212 to depress into the pneumatic blocks 210. When the pneumatic pistons 212 depress, the internal members 105 and 107 move downward and away from the free motion rollers 106 and this movement causes the one or more springs 230 to compress. This causes the powered rollers 118 to disengage from the free motion rollers 106 and creates second position 272 and creates the unstable or slippery walking surface.

In operation, the apparatus 200 may operate in a first mode, which may be a walking or treadmill mode, a second mode, which may be a slip mode, and a third mode, which may be a trip mode. Initially, the apparatus 200 is in a starting position or stationary mode in which the roller table 102 is in a position 270, where the free motion rollers 106 contact the powered rollers 118. The pneumatic pistons 212 are raised from their respective piston blocks 210. Depending upon whether the apparatus is being operated in an automatic or manual mode, either the PLC 129 or an operator triggers a signal to start the apparatus 200 in a first, or treadmill mode.

During the first mode, the speed of the first motor 120 may be controlled and monitored by the PLC 129. The first motor 120 rotates, causing the chain or belt 121 to rotate the powered rollers 118. The rotational motion of the powered rollers 118 transfers to the free motion rollers 106, causing them to rotate as well. The patient 150 walks on the roller table 102 and remains at a constant position/height relative to the ground. The PLC 129 controls the pneumatic pistons 212 to transition the apparatus 200 from treadmill mode to the second or slippery mode. Air compressor 250 causes the pneumatic pistons to depress into the pneumatic blocks 210 to disengage the free motion rollers 106 from the powered rollers 118. Thus, the individual powered rollers 118 can move freely. When in slippery mode, every roller, including free motion rollers 106 and powered rollers 118, is free to move at extremely low friction. The patient is therefore only lifted slightly and should barely notice a change. The patient continues walking, but the surface is very slippery. The patient will therefore likely lose balance and fall. The load cell 126 senses the fall and records the fall signal, which is sent to either the PLC 129 (in automated mode) or logged by an operator (in manual mode). The apparatus 200 is then set back to the starting position 270 or stationary mode. The roller table 102 and pneumatic pistons 212 are returned to their original positions.

The apparatus 200 can also operate in a third, trip mode. During the third mode, the powered rollers 118 remain engaged with the free motion rollers 106, and the powered rollers undergo a burst of increased acceleration, which causes an unexpected increase of the speed of the roller table 102. The first motor 120 can be configured to rotate either clockwise or counter-clockwise, allowing the powered rollers 118 to roll either backward or forward. The patient 150 continues walking, but at a much greater pace, and will therefore likely lose their balance and fall. Similarly to the second mode, the load cell 126 senses the fall and records the fall signal, which is sent to either the PLC 129 (in automated mode) or logged by an operator (in manual mode). The apparatus 200 is then set back to the starting position 270 or stationary mode. The roller table 102 and pneumatic pistons 212 are returned to their original positions.

When in the first and third modes (treadmill and trip mode), all rollers (both free motion and powered) move in unison. The patient uses the apparatus 200 and patient data (such as, but not limited to, falls and imbalance events compared to simulation settings) gathered over time and is saved short term to a data logger connected to the PLC 129 which is connected to all instrumentation. The operating algorithm on the PLC 129 uses the patient data to modify treadmill speeds, directions and the frequency of slip mode and trip mode events. At the end of a patient session, the patient data is uploaded to a network switch that patches it into a database or enterprise system, such as an Electronic Medical Record (EMR) system that stores the patient's history. The data is also sent to an enterprise program that evaluates the data from the session and sends a final report to the equipment to be received by the physical therapist or technician managing the patient. This report provides progress of the patient over a series of sessions using the equipment. The database may also provide additional input to a physical therapist recommending other procedures leading to better patient outcome.

The apparatus 200 disclosed herein may improve the excessive cost of fall injuries on our health system, while also improving quality of life for patients.

Now adding FIG. 8*a*, FIG. 8*b*, FIG. 8*c*, FIG. 8*d*, FIG. 8*e*, and FIG. 8*f* to the consideration, the structure and function of a third embodiment of apparatus 300 can be clearly seen. Apparatus 300 removes powered rollers 118 and instead has contact plate 320. In this embodiment, the free motion rollers 106 are either in a stationary mode/first mode 370 as the contact plate 320 is pressed up against the lower surface of the free motion rollers 106. Or, free motion rollers 106 are in a slippery mode/second mode 372 as the contact plate 320 is lowered and disengaged from the lower surface of the free motion rollers 106. Preferably, the top surface of contact plate 320 is covered with a material that adds friction or grip between the top surface of contact plate 320 and the bottom surface of the free motion rollers 106. Materials include grip coating, rubber, or sandpaper, but these materials are exemplary and are not meant to limit the scope of the disclosure in any manner and all suitable materials are encompassed by this disclosure.

Apparatus 300 includes a roller table 102 upon which a patient 150 may stand and walk. The roller table 102 includes an outer frame 104 which supports a plurality of free motion rollers 106 in parallel, along a single plane. Each roller 106 is positioned next to an adjacent roller 106 with little space in between, such as less than 1⁄16 inch for example, to prevent any pinch points, and to provide the maximum amount of rollers 106 to support the patient, and also to enable the roller table 102 to feel more like a flat stationary surface, especially in stationary mode 370. There are two columns 108 and 110 of rollers 106 positioned adjacent to each other within the outer frame 104. The two columns of rollers 108 and 110 are separated to allow independent rotation and free biaxial motion for each of the patient's feet. The free motion rollers 106 are preferably constructed with a surface material that is elastic or other high friction material.

The roller table 102 is situated atop a base structure 112. The base structure 112 includes a first end 114 and a second end 116. The base structure 112 houses a contact plate 320. The first end 114 of the base structure 112 includes an air compressor 350. However, air compressor 350 can be in any appropriate position on apparatus 300.

The apparatus 300 is in communication with a support structure 124 mounted to a ceiling of a physical therapy space or other building interior. A load cell 126 is located within or secured to the support structure 124, and a safety cord 128 is connected to the load cell 126. The safety cord 128 attaches to a safety harness or belt 340 worn by the patient 150. The load cell 126 senses and records the patient response to the equipment's stimuli, like changes in slope and speed of mode. The load cell 126 is used to measure the amount of weight the patient relies on the safety structure (124, 128, and the harness) during a fall. If no load is applied to the load cell 126, then no fall occurred. If the load cell 126 measures less than half the weight of the patient, then the patient became off balance. If the weight or more than half the weight of the patient is measured by the load cell 126, then the event is recorded as a fall. The fall event information is recorded and can be utilized by a PLC 129 to modify the number, type, or frequency of fall simulations. The load cell 126 may be located within the safety harness or belt 340 rather than in the support structure 124.

The apparatus 300 also includes a PLC 129. The PLC 129 is connected to the base structure 112. Alternatively, the PLC 129 may be located in a panel mounted to the base structure 112. It should be understood that the PLC 129 may be secured to any part of the base structure 112 or apparatus 300. The PLC 129 controls the switching of the apparatus 300, or individual contact plates 320, between the first mode 370 and the second mode 372 as described in more detail below. The PLC 129 controls the actuations and the transitions between the first and second modes 370/372 by using an algorithm that incorporates fall data recorded from the load cell 126.

The PLC 129 preferably has both a manually operated mode and an automated mode. A human machine interface (HMI) is needed to operate either mode and is linked to the PLC 129. The automated mode responds to patient response to stimuli gathered through the load cell 126 and/or additional instrumentation. As the patient improves and responds positively to the slip inducing stimuli, then the automated mode may increase the frequency of transition between the first mode 370 and the second mode 372 resulting in slip/fall simulations.

Base structure 112 has support members 302 and 304. The air compressor 350 is operably connected to one or more pneumatic blocks 310 which each contain a pneumatic piston 312. The one or more pneumatic blocks 310 and also one or more springs 330 are connected to support members 302 and 304. It is preferable that at least four springs 330 are present and one spring 330 is positioned in each of the four interior corners of the base structure 112. The contact plate 320 rests on the one or more pneumatic pistons 312. The one or more springs 330 also contact the contact plate 320 and aid in supporting the contact plate 320.

Figure 8A:
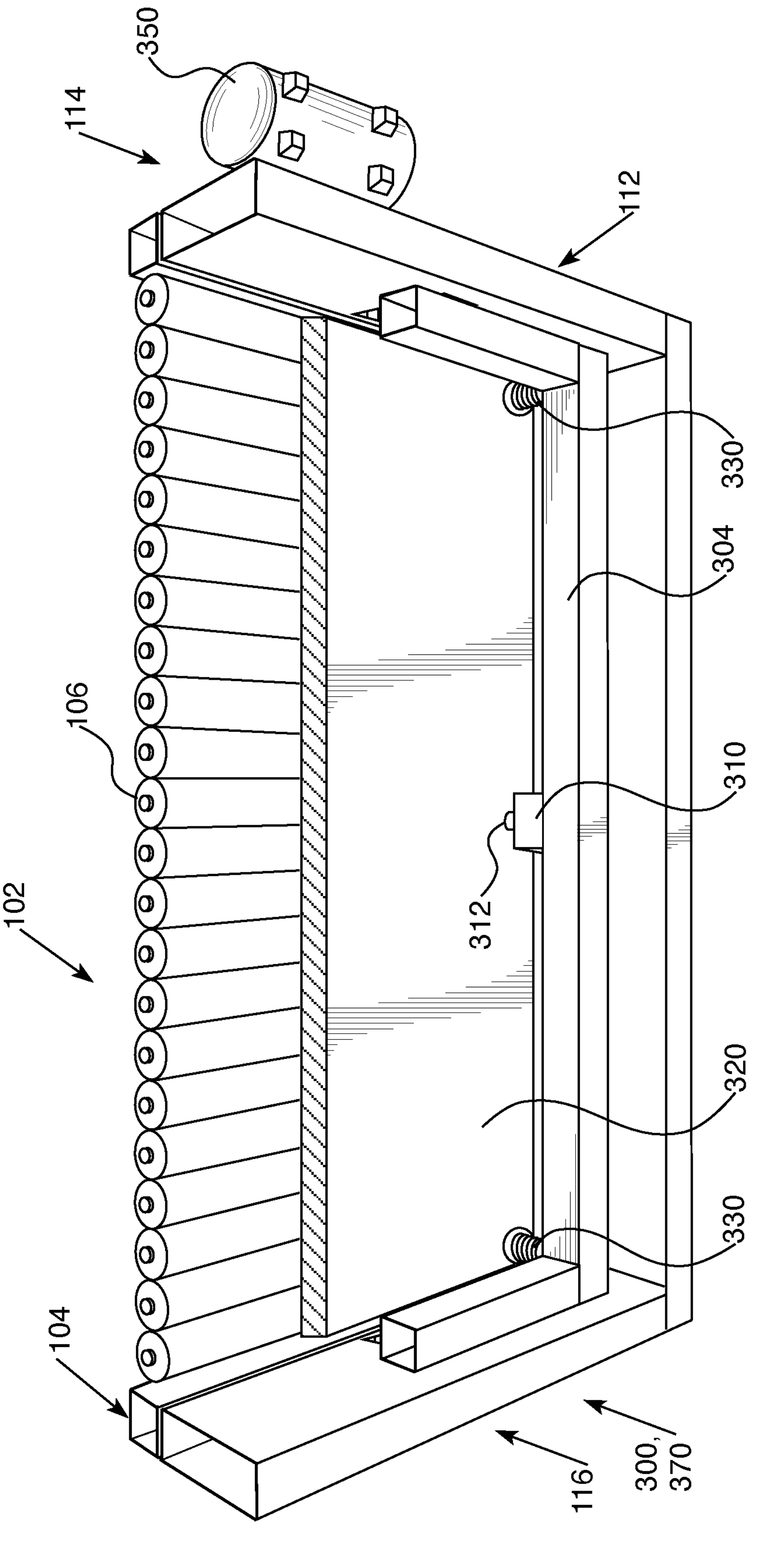
FIG. 8*a* shows a bottom perspective, as a partial cross-section, view of a third embodiment of apparatus 300.

In FIG. 8*a*, the pneumatic blocks 310 are decompressed and the pneumatic pistons 312 are raised from the pneumatic blocks 310. The raising of the pneumatic pistons 312 from the pneumatic blocks 310 raises or lifts upwardly the contact plate 320 toward the free motion rollers 106, thereby engaging contact between the contact plate 320 and the free motion rollers 106 to create stationary position/first mode 370 and this stationary position 370 is supported by the one or more springs 330. This produces the braking action for the more stable, stationary surface.

Figure 8B:
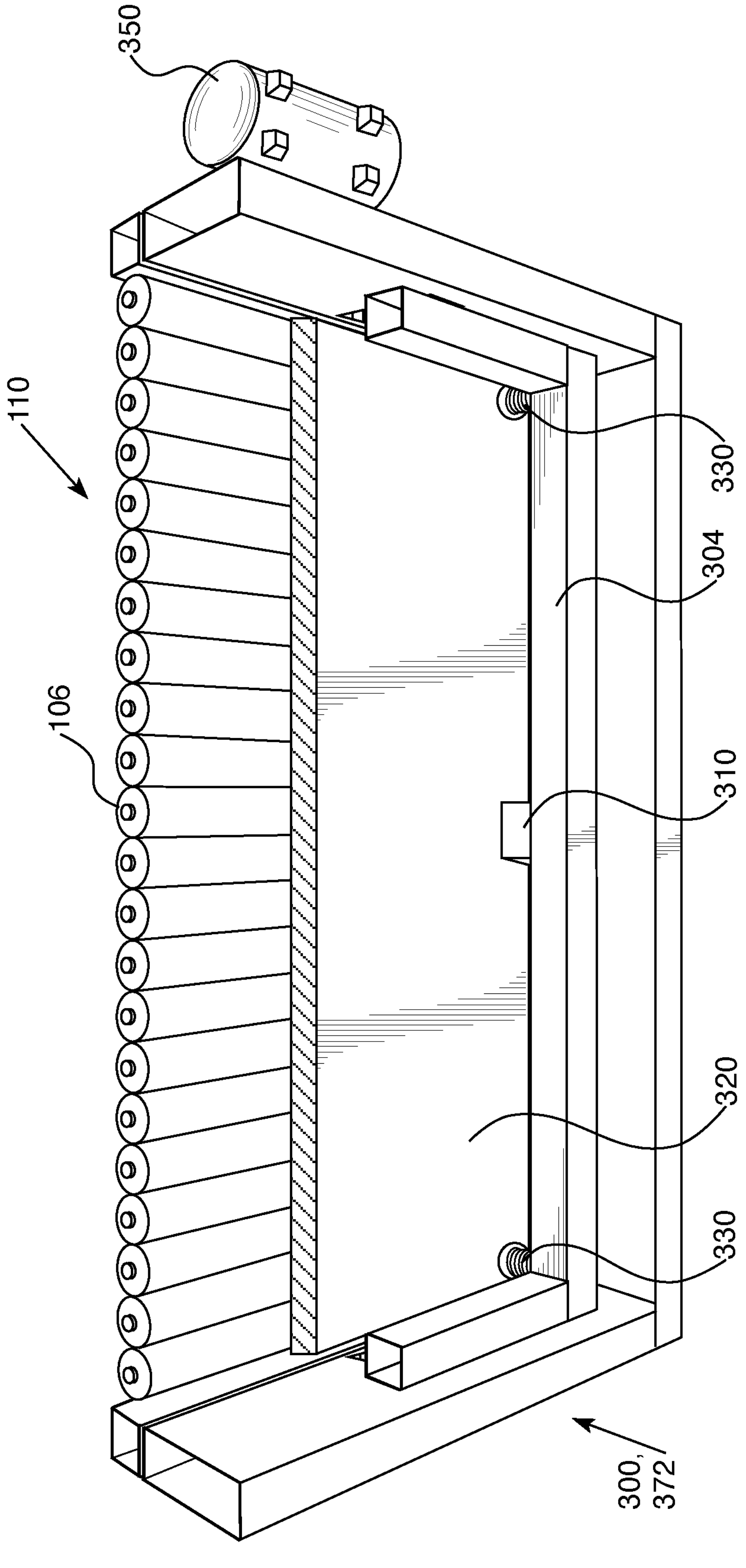
FIG. 8*b* shows a bottom perspective view, as a partial cross-section, of a third embodiment of apparatus 300.

In FIG. 8*b*, to disengage the contact plate 320 from the free motion rollers 106, air compressor 350 provides thrust to the pneumatic blocks 310 which causes the pneumatic pistons 312 to depress into the pneumatic blocks 310. When the pneumatic pistons 312 depress, the contact plate 320 moves downward and away from the free motion rollers 106 and this movement causes the one or more springs 330 to compress. This causes the contact plate 320 to disengage from the free motion rollers 106 and creates slippery mode/second mode 372 and creates the unstable or slippery surface.

In operation, the apparatus 300 may operate in a first mode 370, which is a stationary mode or a second mode 372, which is a slippery mode. Initially, the apparatus 300 is in a starting position or stationary mode 370 in which the roller table 102 is in a stationary mode/first mode 370, where the contact plate 320 contacts the free motion rollers 106. The one or more pneumatic pistons 312 are raised from their respective piston blocks 310. Depending upon whether the apparatus 300 is being operated in an automatic or manual mode, either the PLC 129 or an operator triggers a signal to start the apparatus 300 in a first, or stationary mode 370.

During stationary mode 370, the contact plate 320 is in contact with the free motion rollers 106 creating the stable, stationary surface. The patient 150 walks on the roller table 102 and remains at a constant position/height relative to the ground. The PLC 129 (automated mode) or the operator (manual mode) controls the pneumatic pistons 312 to transition the apparatus 300 from first or stationary mode 370 to the second or slippery mode 372. Air compressor 350 causes the pneumatic pistons 312 to depress into the pneumatic blocks 310 to disengage the free motion rollers 106 from the contact plate 320. Thus, the free motion rollers 106 can move freely. When in slippery mode 372, every free motion roller 106, is free to move at extremely low friction (or as described below certain segments of free motion rollers 106 are free to move at extremely low friction). The patient 150 continues walking, but the surface is very slippery. Unstable patients 150 will therefore likely lose balance and fall. The load cell 126 senses the fall and records the fall signal, which is sent to either the PLC 129 (in automated mode) or logged by an operator (in manual mode). The apparatus 300 is then set back to the starting position or stationary mode 370. The contact plate 320 and pneumatic pistons 312 are returned to their original positions.

When in the first mode (stationary) 370, all free motion rollers 106 are in a locked position (or as described below certain segments of free motions rollers 106 are in a locked position). The patient uses the apparatus 300 and patient data (such as, but not limited to, falls and imbalance events compared to simulation settings) is gathered over time and is saved short term to a data logger connected to the PLC 129 which is connected to all instrumentation. The operating algorithm on the PLC 129 uses the patient data to modify the frequency of slip mode events (patient falls and imbalances). At the end of a patient session, the patient data is uploaded to a network switch that patches it into a database or enterprise system, such as an Electronic Medical Record (EMR) system that stores the patient's history. The data is also sent to an enterprise program that evaluates the data from the session and sends a final report to the apparatus 300 to be received by the physical therapist or technician managing the patient 150. This report provides progress of the patient 150 over a series of sessions using the apparatus 300. The database may also provide additional input to a physical therapist recommending other procedures leading to better patient outcome.

The apparatus disclosed herein may improve the excessive cost of fall injuries on our health system, while also improving quality of life for patients.

Figure 8C:
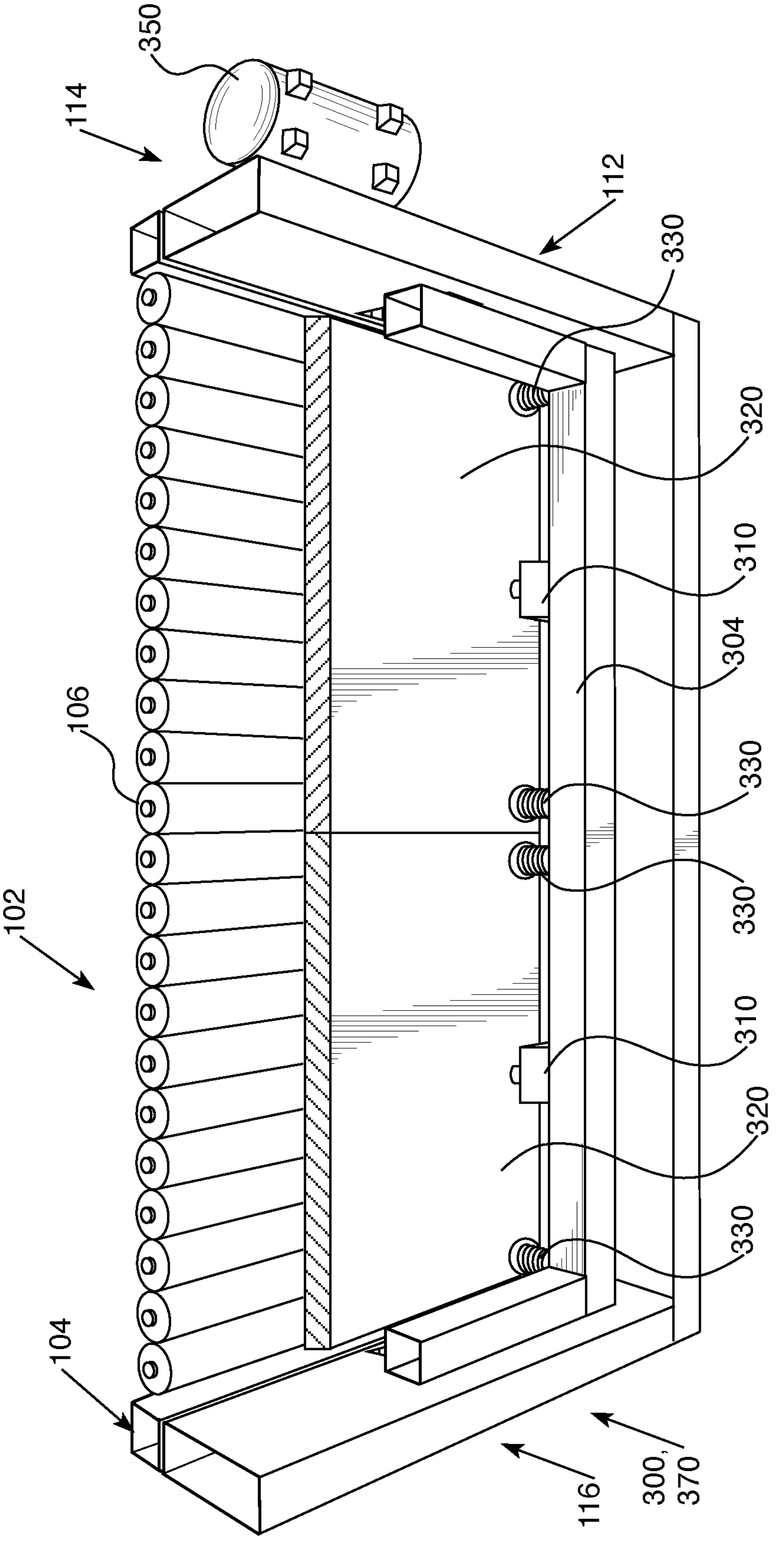
FIG. 8*c* shows a bottom perspective, as a partial cross-section, view of a third embodiment of apparatus 300 with two contact plates 320.

In FIG. 8*c*, the function of apparatus 300 is as previously described. In this embodiment, there are two contact plates 320 and at least one pneumatic block 310 with a pneumatic piston 312 operably engaged with each contact plate 320. Also, additional springs 330 may be placed to further support each contact plate 320.

Figure 8D:
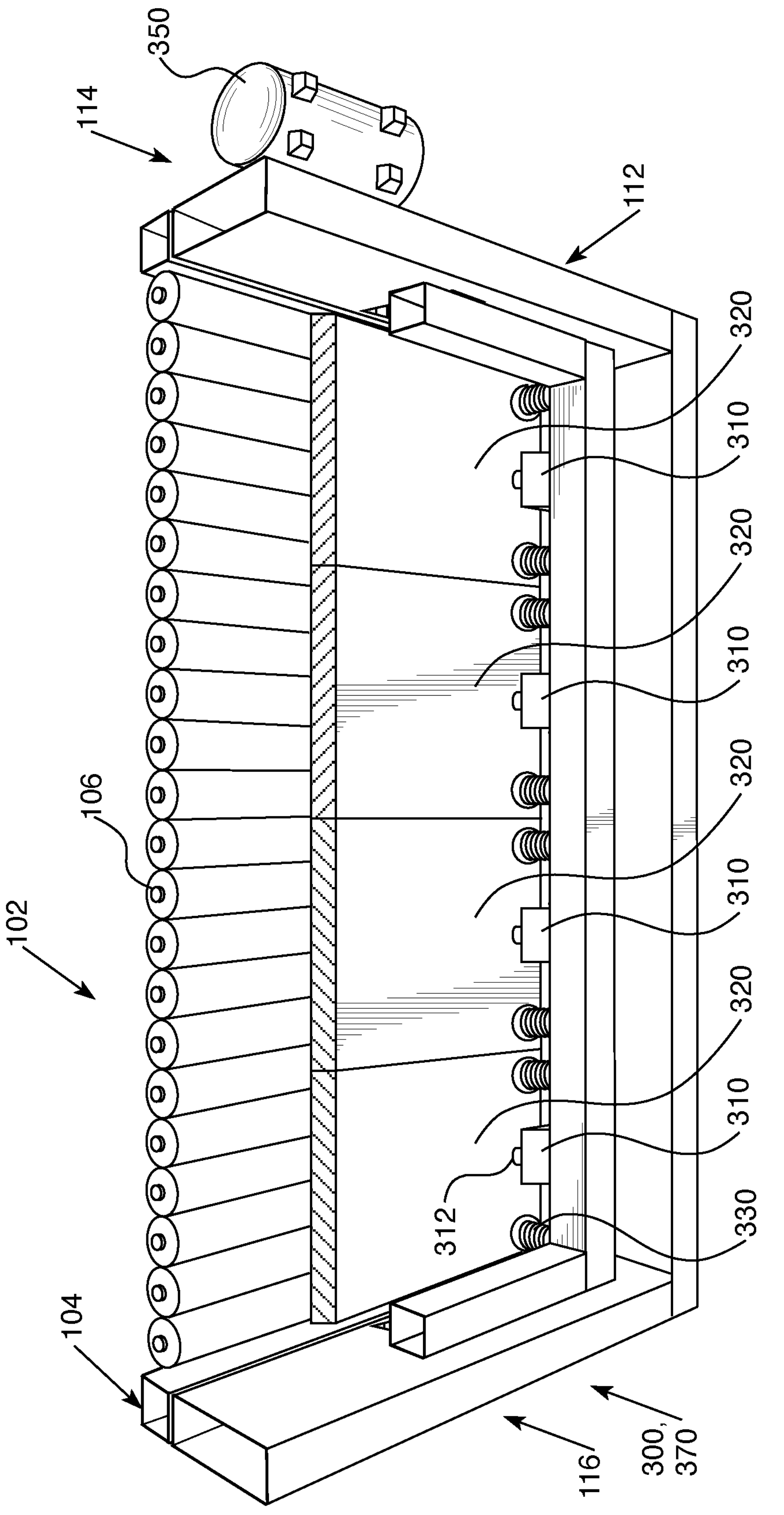
FIG. 8*d* shows a bottom perspective, as a partial cross-section, view of a third embodiment of apparatus 300 with four contact plates 320.
Figure 8E:
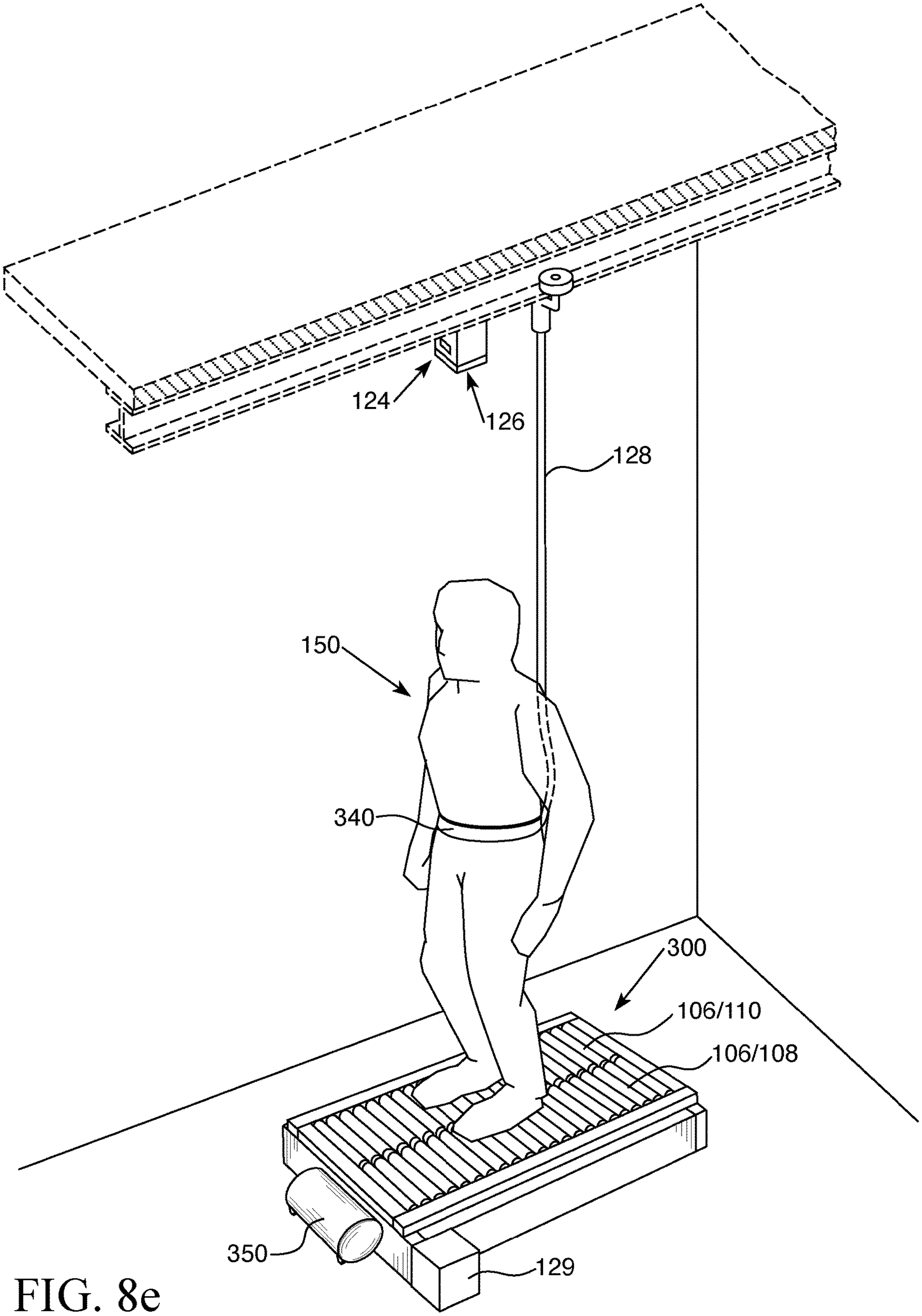
FIG. 8*e* shows a perspective view of a third embodiment of apparatus 300 attached to a ceiling of a room with the ceiling depicted in phantom.
Figure 8F:
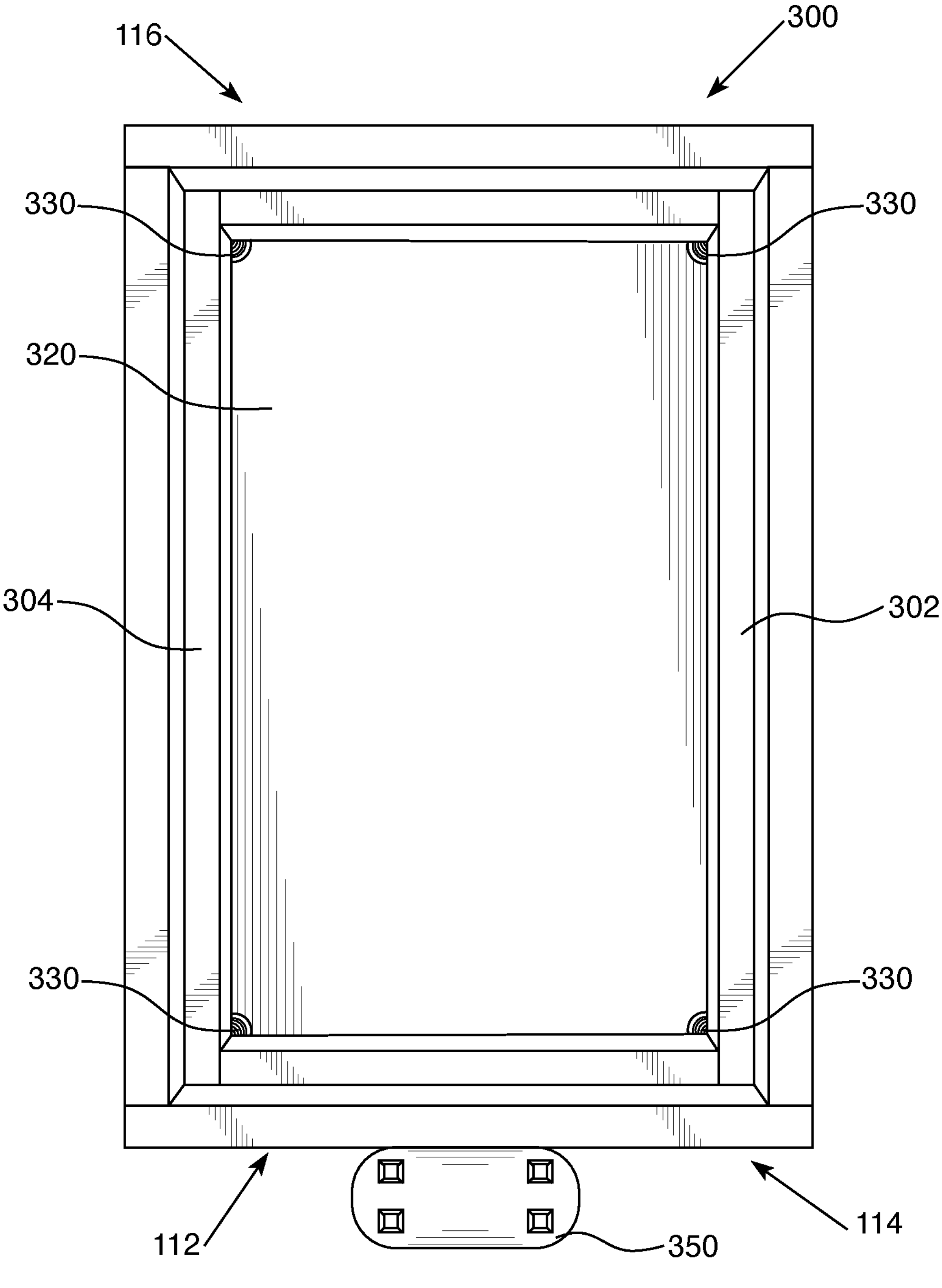
FIG. 8*f* shows a bottom plan view of a third embodiment of apparatus 300.

In FIG. 8*d*, the function of apparatus 300 is as previously described. In this embodiment, there are four contact plates 320 and at least one pneumatic block 310 with a pneumatic piston 312 operably engaged with each contact plate 320. Also additional springs 330 may be placed to further support each contact plate 320.

The embodiments of apparatus 300 contained in FIG. 8*c* and FIG. 8*d*, allow for different surfaces upon which patient 150 may walk. In FIG. 8*c*, one contact plate 320 may be engaged with free motion rollers 106 to create the stable stationary surface in stationary/first mode 370, while the other contact plate 320 may be disengaged with free motion rollers 106 to create the second or slippery mode 372. Or, both contact plates 320 may be engaged with free motion rollers 106 to create the stable surface for the stationary mode 370. Or, neither contact plate 320 may be engaged with the free motion rollers 106 to create the second or slippery mode 372.

In FIG. 8*d*, all contact plates 320 may be engaged with free motion rollers 106 to create the stable surface for the stationary mode 370. Or, none of the contact plates 320 may be engaged with free motion rollers 106 to create the second or slippery mode 372. Or, any combination of contact plates 320 may be engaged with free motion rollers 106 and disengaged from free motion rollers 106 to create a variety of walking surfaces. For example, the first and second contact plates 320 from the second end 116 may be engaged with free motion rollers 106 to create the stable surface for the stationary mode 370 and the first and second contact plates 320 from the first end 114 may be disengaged from free motion rollers 106 to create the second slippery mode 372. Any combination of contact plates 320 can be engaged or disengaged from free motion rollers 106 to create the desired surfaces for the segments of free motion rollers 106 each individual contact plate 320 contacts or does not contact.

Preferably, each of the top surfaces of contact plates 320 are covered with a material that adds friction or grip between the top surface of each contact plate 320 and the bottom surface of the free motion rollers 106. It is preferred that the material is added to the top surface of each contact plate 320, but does not overlap into other contact plates 320, so that each contact plate 320 can move independently of the others. Materials include grip coating, rubber, or sandpaper, but these materials are exemplary and are not meant to limit the scope of the disclosure in any manner and all suitable materials are encompassed by this disclosure.

In the depicted embodiments, one, two, and four contact plates 320 are disclosed. But, any suitable number of contact plates 320 can be utilized and are encompassed by this disclosure.

While various aspects and embodiments have been disclosed, other aspects and embodiments will be apparent to those skilled in the art. The various aspects and embodiments provided in this disclosure are for purposes of illustration and are not intended to be limiting, with the true scope being indicated by the following claims, along with the full scope of equivalents to which the claims are entitled.

The invention claimed is:

1. A physical therapy apparatus comprising:

a) a base structure;

b) a roller table positioned on the base structure, the roller table including an outer frame and a plurality of free motion rollers positioned within the outer frame;

c) at least one air compressor connected to the base structure;

d) a contact plate located within the base structure and operably connected to the at least one air compressor, the contact plate being positioned beneath the plurality of free motion rollers;

e) at least one pneumatic block containing at least one pneumatic piston located within the base structure and operably connected to the at least one air compressor, the at least one pneumatic piston being configured to raise and lower the contact plate to transition the physical therapy apparatus between a first mode and a second mode;

f) a load cell in communication with the physical therapy apparatus, the load cell being configured to sense and record a patient's response to the transition of the contact plate from the first mode to the second mode; and g) a programmable logic controller (PLC) in communication with the load cell, the PLC being configured to control the transition of the physical therapy apparatus between the first mode and the second mode.

2. The physical therapy apparatus of claim 1, wherein the plurality of free motion rollers are aligned in two parallel columns along a single plane.

3. The physical therapy apparatus of claim 2 further comprising the at least one air compressor configured to provide thrust to the at least one pneumatic piston.

4. The physical therapy apparatus of claim 1 further comprising:

a) at least two springs located within the base structure, wherein the base structure has at least two support members attached thereto and each of the at least two springs are attached to at least one of the at least two support members;

b) the at least one pneumatic block being attached to at least one of the at least two support members;

c) the contact plate resting upon the at least two springs and the at least one pneumatic piston; and d) the at least one pneumatic piston being operably connected to the at least one air compressor.

5. The physical therapy apparatus of claim 4, further comprising:

a) a support structure secured to a ceiling, wherein the load cell is secured to the support structure;

b) a safety cord secured to the load cell, wherein the safety cord is configured to attach to a belt or harness on the patient; and c) the PLC having an automated mode and a manual mode.

6. A physical therapy apparatus comprising:

a) a base structure;

b) a roller table positioned on the base structure, the roller table including an outer frame and a plurality of free motion rollers positioned within the outer frame;

c) at least one air compressor connected to the base structure;

d) a plurality of contact plates located within the base structure and each of the plurality of contact plates operably connected to the at least one air compressor, the plurality of contact plates being positioned beneath the plurality of free motion rollers;

e) a plurality of pneumatic blocks each containing at least one pneumatic piston located within the base structure and operably connected to the at least one air compressor, wherein each of the plurality of contact plates is operably engaged with at least one of the plurality of pneumatic pistons, further wherein the plurality of pneumatic pistons being configured to raise and lower the plurality of contact plates to transition the plurality of free motion rollers between a first mode and a second mode;

f) a load cell in communication with the physical therapy apparatus, the load cell being configured to sense and record a patient's response to the transition of each of the plurality of contact plates from the first mode to the second mode; and g) a programmable logic controller (PLC) in communication with the load cell, the PLC being configured to control the transition of each of the plurality of contact plates between the first mode and the second mode.

7. The physical therapy apparatus of claim 6 further comprising:

a) a plurality of springs located within the base structure, wherein the base structure has at least two support members attached thereto and each of the plurality of springs are attached to at least one of the at least two support members;

b) the plurality of pneumatic blocks being attached to at least one of the at least two support members;

c) each of the plurality of contact plates resting upon at least one of the plurality of springs and at least one of the plurality of pneumatic pistons; and d) each of the plurality of pneumatic pistons being operably connected to the at least one air compressor.

8. The physical therapy apparatus of claim 7, further comprising:

a) a support structure secured to a ceiling, wherein the load cell is secured to the support structure;

b) a safety cord secured to the load cell, wherein the safety cord is configured to attach to a belt or harness on the patient; and c) the PLC having an automated mode and a manual mode.

9. The physical therapy apparatus of claim 6 wherein the plurality of free motion rollers are aligned in two parallel columns along a single plane.

10. The physical therapy apparatus of claim 6 further comprising the at least one air compressor configured to provide thrust to each of the pneumatic pistons.

11. A method of using a physical therapy apparatus comprising:

a) providing a physical therapy apparatus comprising:

i) a base structure having a roller table positioned thereon, the roller table including an outer frame and a plurality of free motion rollers positioned within the outer frame;

ii) at least one air compressor operably connected to the base structure;

iii) at least one contact plate located within the base structure and operably connected to the at least one air compressor, the at least one contact plate being positioned beneath the plurality of free motion rollers;

iv) at least one pneumatic block containing at least one pneumatic piston located within the base structure and operably connected to the at least one air compressor, the at least one pneumatic piston being configured to raise and lower the at least one contact plate to transition the physical therapy apparatus between a first mode and a second mode;

b) operating the physical therapy apparatus in a first mode, wherein a patient walks on the roller table in which the at least one contact plate is in contact with the plurality of free motion rollers;

c) operating the physical therapy apparatus in a second mode in which the at least one pneumatic piston lowers the at least one contact plate so that the plurality of free motion rollers are not in contact with the at least one contact plate; and d) sensing and recording a patient's response to the second mode via a load cell.

12. The method of claim 11 further comprising sending the patient's response to a programmable logic controller.

* * * * *